United States Patent
Holderbaum

[11] 4,200,377
[45] Apr. 29, 1980

[54] FOCUSING MECHANISM FOR CAMERA OBJECTIVE

[75] Inventor: Karl H. Holderbaum, Bad Kreuznach, Fed. Rep. of Germany

[73] Assignee: Jos. Schneider & Co., Optische Werke Kreuznach, Bad Kreuznach, Fed. Rep. of Germany

[21] Appl. No.: 894,031

[22] Filed: Apr. 6, 1978

[30] Foreign Application Priority Data

Apr. 7, 1977 [DE] Fed. Rep. of Germany ....... 2715646

[51] Int. Cl.² .......................... G02B 15/14; G03B 3/00
[52] U.S. Cl. ..................................... 354/195; 350/187
[58] Field of Search ........................ 354/25, 195–199; 350/186, 187, 254, 255; 352/140; 353/76; 355/55

[56] References Cited

U.S. PATENT DOCUMENTS

| | | | |
|---|---|---|---|
| 1,350,683 | 8/1920 | Stringham | 350/255 |
| 3,165,044 | 1/1965 | Himmelsbach | 350/255 |
| 3,209,367 | 9/1965 | Heden | 352/140 |
| 3,482,500 | 12/1969 | Thomas | 354/196 |
| 3,656,422 | 4/1972 | Hess et al. | 350/255 |
| 4,002,405 | 1/1977 | Stahl | 354/195 X |
| 4,057,327 | 11/1977 | Kumazawa | 350/187 |

FOREIGN PATENT DOCUMENTS

| | | | |
|---|---|---|---|
| 1101801 | 3/1961 | Fed. Rep. of Germany | 354/195 |
| 1142756 | 1/1963 | Fed. Rep. of Germany | 354/199 |
| 1268785 | 6/1961 | France | 354/195 |
| 2007828 | 1/1970 | France | 350/187 |

*Primary Examiner*—L. T. Hix
*Assistant Examiner*—Thomas H. Tarcza
*Attorney, Agent, or Firm*—Karl F. Ross

[57] ABSTRACT

A front component of a varifocal camera objective, axially shiftable for focusing purposes, is provided with a lens mount held by an axially extending guide rod which is slidably received in an inner annular flange and an end wall of a lens barrel. The guide rod has a rear extremity provided with male threads engaged by a drive nut held captive in the end wall, the nut being provided with outer gear teeth meshing on the one hand with a pinion, driven by a reversible electric motor via a slipping clutch, and on the other hand with a toothed wheel on the shaft of a milled setting wheel which projects from the camera housing. An ancillary rod, parallel to the driven guide rod but shorter than the latter, slides only in the annular flange and has its rear end gripped by a bracing ring also engaging the driven guide rod to form a cage.

6 Claims, 1 Drawing Figure

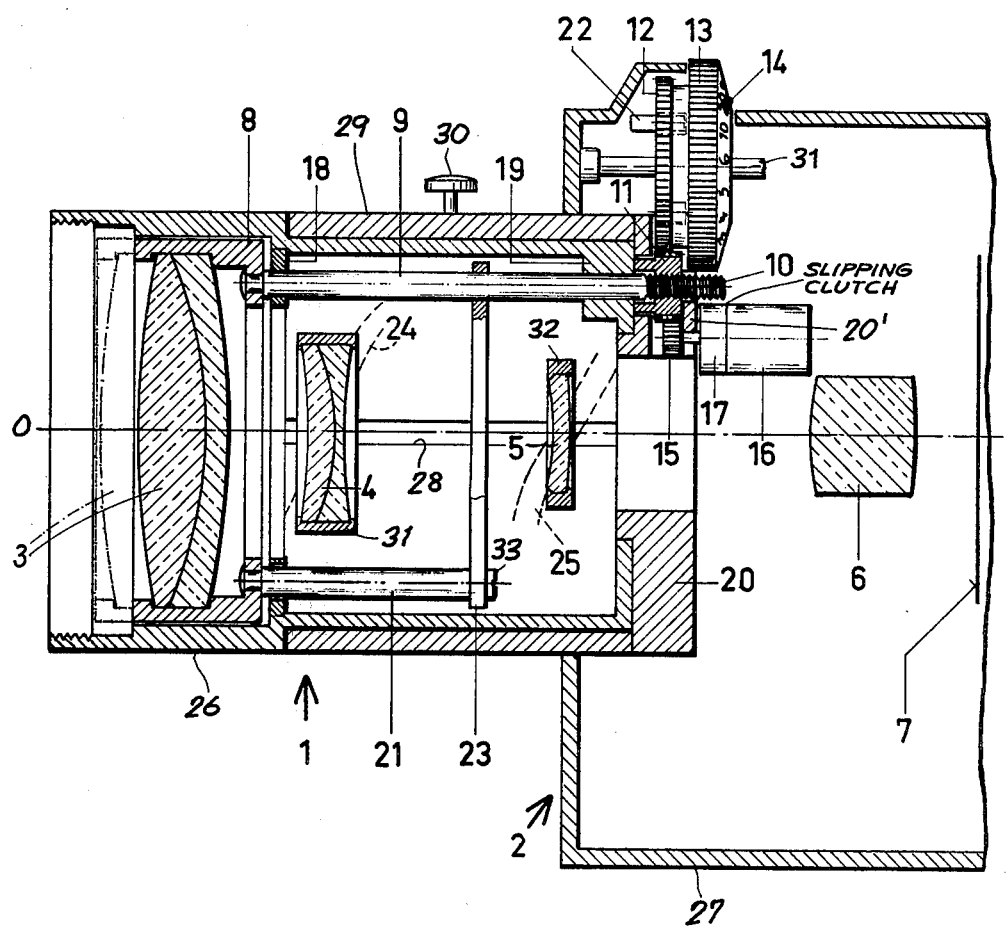

FOCUSING MECHANISM FOR CAMERA OBJECTIVE

FIELD OF THE INVENTION

My present invention relates to a photographic or cinematographic camera whose objective includes one or more lenses that are axially shiftable for focusing purposes.

BACKGROUND OF THE INVENTION

Conventional cameras with focusable objectives are provided with an outer, axially fixed setting ring rotatably mounted on a lens barrel and provided with female threads engaging male threads of an inner guide ring which is held against rotation and is rigid with a lens mount supporting the shiftable lens or lenses, the latter usually constituting a front component of the objective. The two rings are centered on the objective axis and are therefore of a rather large diameter, resulting in considerable friction along their threaded contact surfaces. Moreover, the manual adjustment of a setting ring located forwardly of the camera body is inconvenient while automatic focusing with such an assembly is rather difficult.

In commonly owned U.S. Pat. No. 3,482,500 there has been disclosed a control mechanism for manual and automatic focusing in which a lens mount is supported by several axially extending guide rods, one of these rods having threads engaged by a nut which is integral with the shiftable lens mount. It has also been proposed to provide a shiftable lens support with an axially extending rack engaged by a rotatable worm; see German Pat. No. 1,101,801.

OBJECTS OF THE INVENTION

An object of my present invention is to provide a manually and/or automatically operable focusing mechanism for a photographic or cinematographic camera (this also includes television cameras) which has a reduced frictional resistance and can therefore be adjusted with little expenditure of energy.

Another object is to simplify the manipulation of such a focusing mechanism by allowing the positioning of a manually operable setting member on the camera body proper.

SUMMARY OF THE INVENTION

In accordance with my present invention, a guide rod fastened to a shiftable lens mount is slidably but nonrotatably held in stationary bearing means inside a lens barrel and extends rearwardly from that lens mount parallel to the optical axis of the objective, terminating in a threaded rear extremity within the camera housing which is engaged by a captive drive nut held in that housing against axial displacement. The nut is provided with external gear teeth in mesh with gear means forming part of the focusing mechanism. Advantageously, the gear means include a toothed wheel coaxial with a manually rotatable setting wheel projecting from the housing, the two wheels being positively coupled with each other and centered on an axis parallel to that of the objective, and further include a motor-driven pinion. The coupling between the pinion and its motor preferably comprises a slipping clutch to allow for manual setting without a decoupling of the motor; the slipping clutch also lets the motor continue its rotation when the lens mount is arrested in one of its limiting positions by a stop rigid with the two wheels.

BRIEF DESCRIPTION OF THE DRAWING

The above and other features of my invention will now be described in detail with reference to the accompanying drawing the sole FIGURE of which illustrates, somewhat diagrammatically and in axial section, a motion-picture camera with a varifocal objective focusable by a mechanism according to my invention.

SPECIFIC DESCRIPTION

The camera shown in the drawing comprises a varifocal or zoom-type objective, generally designated 1, and a camera body, generally designated 2. The objective 1 is provided with a lens barrel 26 which projects from the camera housing 27 and is centered on an optical axis 0. Also centered on this axis are several lens members constituting a positively refracting front component 3, two negatively refracting intermediate components 4, 5 and a stationary rear component 6; the latter, disposed outside lens barrel 26 within housing 27, consists of a plurality of lenses not illustrated individually.

As is well known per se, an axial shifting of the second component 4 changes the focal length of lens assembly 3 - 6 and must be accompanied by a compensatory displacement of the third component 5 in order to keep the image plane of the objective coincident with the sensitive surface of a film 7. The concurrent shifting of components 4 and 5 is brought about by the rotation of a sleeve 29, provided for this purpose with a knob 30, which has camming grooves 24, 25 engaged by respective pins that pass through an axially extending slot 28 of the lens barrel 26 and are rigid with their respective lens mounts 31, 32. The lens mounts are slidably supported by axially extending guide rods not shown.

Front component 3, here shown as a compound lens, is provided with a lens mount 8 which is axially movable independently of lens mounts 31, 32 for focusing the objective upon an object to be photographed, either manully or automatically under the control of a conventional distance finder. Lens mount 8 is cantilevered on an axially extending guide rod 9 which is slidably and nonrotatably received in an inner annular flange 18 of lens barrel 26 as well as in a bearing block 19 forming part of a rear wall 20. The extremity of guide rod 9 projecting rearwardly beyond the bearing block 19, located within camera housing 27, carries male threads 10 matingly engaged by a captive nut 11 which is held against axial displacement by the block 19 and by an extension 20' of end wall 20.

Nut 11 carries external gear teeth in mesh with a toothed wheel 12, of larger diameter, which is rigid with a milled setting wheel 13 rotatable about a shaft 31 whose axis parallels the optical axis 0. Setting wheel 13, whose diameter—like that of wheel 12—is considerably smaller than that of lens barrel 26, partly projects through a lateral slot of camera housing 27 and carries a rearwardly facing distance scale 14 easily observable by the user. The manual rotation of wheels 12 and 13 is limited to less than a full revolution by a stud 22 projecting axially therefrom so as to come to rest on the periphery of end wall 20 in an infinity position and in a closeup position; the latter setting corresponds to a position of component 3 and lens mount 8 shown in dot-dash lines.

A reversible electric motor 16, energizable (e.g. as described in commonly owned U.S. Pat. No. 3,165,044) from a nonillustrated power supply, is connected via a slipping clutch 17 with the shaft of a pinion 15 also meshing with the gear teeth of nut 11. The automatic displacement of nut 11 and lens mount 8 by motor 16, under the control of the aforementioned distance finder for example, can thus be overridden by manipulation of setting ring 13 even if motor 16 is of the self-locking (e.g. stepping) type.

In order to hold the lens mount 8 against rotation, and to prevent jamming or canting, I provide that lens mount with an ancillary guide rod 21 also slidable in flange 18 but terminating short of end wall 20. The two parallel rods 9 and 21 are fixedly interconnected, inside lens barrel 26, by a bracing ring 23 fastened to the rear end of rod 21 by a screw 33 and frictionally fitted onto an intermediate portion of the driven guide rod 9. It will be observed that ring 23 lies between the cam tracks 24 and 25 of components 4 and 5 so as not to interfere with their displacement by sleeve 29. Such a precaution, however, will not be necessary if the shifting of these components for zooming purposes is controlled by a camming sleeve of smaller diameter lodged inside ring 23. In either case, lens mount 8 forms with the two diametrically opposite rods 9 and 21 as well as ring 23 a rigid cage insuring precise axial movement of component 3 upon rotation of drive nut 7.

The relocation of the manual focusing means 13, 14 from the vicinity of the front end of the objective, pursuant to conventional practice, to a position on the camera housing 27, according to my invention, leaves that front end free for the emplacement of various attachments such as supplemental lenses, filters or lens hoods without interfering with incident light rays.

With pinion 15 of smaller diameter than nut 11, a favorable transmission ratio exists between motor 16 and guide rod 9 so that the frictional resistance encountered by the motor is small, its energy consumption is low and precise focusing is possible, e.g. under the control of an electronic comparator measuring contrasts between adjacent image points against a locally generated reference parameter. Other known distance meters usable for automatic focusing control operate with emitters of infrared radiation or radar pulses and corresponding receivers on the camera.

It will be apparent that more than a single component of an objective—possibly the entire lens assembly thereof—can be axially shifted for focusing purposes by the mechanism according to my invention.

I claim:

1. In a camera provided with a housing and an objective projecting forwardly from said housing, said objective including a lens barrel centered on an optical axis and a plurality of lenses in said lens barrel, at least one of said lenses being provided with an axially shiftable lens mount, the combination therewith of:
stationary bearing means in said lens barrel;
a guide rod slidably and nonrotatably held in said bearing means, said guide rod being fastened to said lens mount and extending rearwardly therefrom parallel to said optical axis while terminating in a threaded rear extremity within said housing;
a rotatable captive drive nut matingly engaging said extremity, said nut being provided with external gear teeth and being held against axial displacement in said housing;
focusing means for rotating said nut to shift said lens mount along with said lenses, said focusing means including a setting wheel on an ancillary shaft parallel to said optical axis, said setting wheel projecting from said housing for manual rotation; and
a spur gear on said ancillary shaft rigid with said setting wheel and in mesh with the gear teeth of said nut.

2. The combination defined in claim 1 wherein said focusing means further comprises a reversible motor and a pinion coupled with said motor via a slipping clutch, said pinion meshing with said gear teeth.

3. The combination defined in claim 2, further comprising stop means rigid with said setting wheel for limiting the rotation thereof to less than a full revolution.

4. The combination defined in claim 1 or 2, further comprising an ancillary rod parallel to said guide rod and shorter than the latter, said bearing means including an internal annular flange on said lens barrel close to said lens mount, said ancillary rod being slidably guided in said flange.

5. The combination defined in claim 4, further comprising annular bracing means centered on said optical axis rigidly connecting the rear end of said ancillar rod with an intermediate portion of said guide rod.

6. The combination defined in claim 5 wherein said one of said lenses is part of a front component of the objective, said lenses further formina a pair of additional components axially shiftable independently of said front component to vary the focal length of the objective, said annular bracing means being disposed between the paths of displacement of said additional components.

* * * * *